United States Patent [19]
Hutchings et al.

[11] Patent Number: 5,232,196
[45] Date of Patent: Aug. 3, 1993

[54] PROPORTIONAL SOLENOID CONTROLLED VALVE

[75] Inventors: Peter G. Hutchings, Nashua; Richard L. Dalton, Jr., Temple, both of N.H.; John C. Anthony, Fairfield, Conn.

[73] Assignee: LDI Pneutronics Corporation, Hollis, N.H.

[21] Appl. No.: 861,239

[22] Filed: Mar. 31, 1992

[51] Int. Cl.$^5$ .............................. F16K 31/06
[52] U.S. Cl. ..................... 251/129.08; 251/129.15
[58] Field of Search ................ 251/129.08, 129.15

[56] References Cited

U.S. PATENT DOCUMENTS

| | | | |
|---|---|---|---|
| 3,827,672 | 8/1974 | Stampli | 251/77 X |
| 4,245,815 | 1/1981 | Willis | 251/129.08 |
| 4,635,683 | 1/1987 | Nielsen | 251/129.08 X |
| 4,664,136 | 5/1987 | Everett | 251/129.08 X |
| 4,954,799 | 9/1990 | Kumar | 251/129.08 X |

*Primary Examiner*—Arnold Rosenthal
*Attorney, Agent, or Firm*—Fish & Richardson

[57] ABSTRACT

A proportional solenoid-controlled valve provides for precise control of fluid flow using a flat spring and a damper. The flat spring is three-lobed and is constrained on its outer diameter in one of six degrees of freedom. The damper has three outer lobes which are compressed between the armature assembly and the valve body. A spring-loaded seal configuration having an annular elastomer seal compensates for dimensional instability of the elastomeric seal material and the armature assembly.

10 Claims, 6 Drawing Sheets

PROPORTIONAL SOLENOID CONTROLLED VALVE

BACKGROUND OF THE INVENTION

The present invention relates in general to proportional solenoid valves, and more particularly to the displacement control structure of a proportional solenoid valve through which fluid flow is precisely controlled.

The present valve is an improvement on the valve disclosed in U.S. Pat. No. 4,245,815, assigned to the assignee of the present invention.

A proportional solenoid valve allows the flow through the valve to controllably vary, whereas a standard solenoid valve is either completely open or completely closed. In prior art proportional valves, such as that shown in U.S. Pat. No. 4,245,815, a compression spring is used to provide a force opposite to that of the solenoid. When the solenoid power is off, the spring forces the armature assembly against the valve seat, and the valve is closed. As the solenoid power gradually increases, the armature assembly should move gradually away from the valve seat, allowing the flow through the valve to also gradually increase. However, a low-stiffness spring such as that shown in U.S. Pat. No. 4,245,815, is quickly overcome by the solenoid pull force, which causes the valve to immediately open completely. Therefore, in prior art valves, additional features are required to provide the necessary stiffness to ensure proportional travel control of the armature assembly. Such prior art valves require high precision machining and costly assembly techniques.

It therefore is an object of the present invention to provide a proportional solenoid valve having a spring with the required stiffness to ensure proportional travel control of the armature assembly.

It also is an object of the present invention to provide a damper mounted on the armature assembly of a proportional solenoid valve to ensure proportional travel control of the armature assembly.

It is a further object of the present invention to provide a seal configuration in a proportional solenoid valve so that the spring that opposes the solenoid pull force is insulated from any dimensional instability of the seal or the armature assembly.

SUMMARY OF THE INVENTION

The solenoid-controlled proportional flow valve of the present invention has a solenoid with an axially extending coil and a valve body with an axially extending cavity. The valve body has a first fluid passage and a second fluid passage with a valve seat surrounding the first passage. A valve armature assembly moves axially within the cavity toward and away from the valve seat to control fluid flow.

A spring-loaded seal configuration is located at the end of the armature assembly adjacent to the valve seat. The axial cavity at the end of the armature assembly contains an annular elastomer seal with a metal back plate attached to a low spring rate coil spring. The coil spring is attached to the armature assembly. The spring-loaded seal configuration compensates for any dimensional instability of the elastomeric seal material and/or the armature assembly.

An annular flat spring provides resistance to the force induced by the solenoid. The flat spring is three-lobed and is constrained on its outer diameter in one of the six degrees of freedom. The outside diameter of the flat spring is held between an O-ring and a ledge on the valve body. The inside diameter of the flat spring is held by a ledge on the armature assembly. The flat spring regulates the displacement of the armature assembly and provides for proportional flow of fluid through the valve in response to the current, and hence force, through the solenoid coil.

An annular damper having three outer lobes of semi-circular shape is mounted on the armature assembly, and also provides control for the proportional flow of fluid through the valve. The three damper outer lobes are compressed against the valve body. As the armature assembly moves away from the valve seat in proportion to the flow of current through the solenoid, the three outer lobes of the damper remain adjacent to and in frictional contact with the valve body, while the damper deforms over the range of armature assembly travel.

BRIEF DESCRIPTION OF THE DRAWINGS

Other objects, features and advantages of the invention will be apparent from the further description, together with the drawings in which:

FIG. 1 is a cross-sectional view of the valve;

DESCRIPTION OF A PREFERRED EMBODIMENT

Figure 2A:
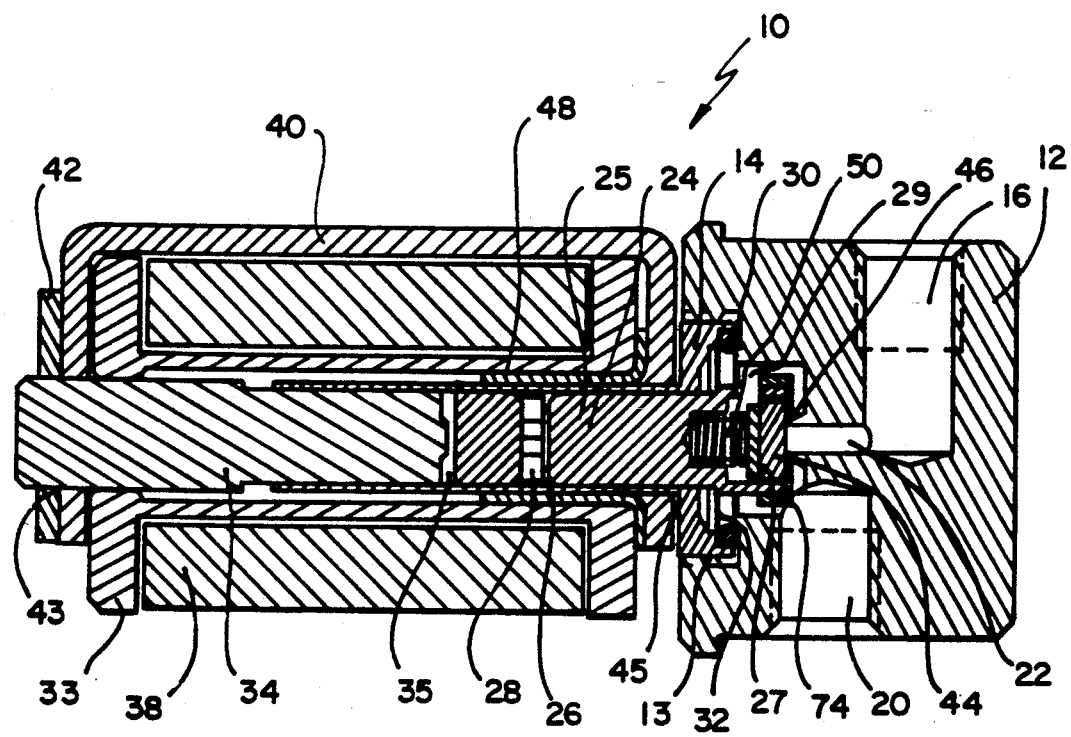
FIG. 2A is a top view of the valve elastomer damper element.

Referring to FIG. 1, a proportional solenoid valve 10 of the present invention has a cylindrical magnetic coil 38 which surrounds a hollow bobbin 33. A stem assembly 14 and a pole piece 34 are contained within hollow bobbin 33. A yoke 40 is of rectangular cross section, and has two openings 43, 45 which allow the yoke 40 to slip over the stem assembly 14 and pole piece 34. A flat compression C-ring 42 surrounds pole piece 34, and is used to retain yoke 40 to magnetic coil 38 and bobbin 33 assembly.

A cylindrical metallic armature assembly 24 is contained within the central cavity of the valve 10 defined by bobbin 33. The armature assembly 24 includes a solenoid plunger portion 25 and a poppet portion 27. An elastomer damper element 28 is mounted on a cylindrical groove 26 of armature assembly 24.

The cylindrical stem assembly 14 has an internal bore to receive the armature assembly 24. A threaded interface 13 attaches the stem assembly 14 to a cylindrical valve body 12. At the opposite end of the threaded interface, the stem assembly 14 has an elongated cylindrical portion that is brazed to cylindrical pole portion 34. A flux concentrator 48 is a tube used to concentrate and transmit magnetic flux. The valve body 12 has inlet ports 16 and outlet ports 20 which allow fluid to enter and exit a centrally located orifice 22 of the valve.

An elastomer O-ring 30 is contained between the stem assembly 14 and the valve body 12 to prevent external leakage. A flat spring 32 is constrained on its outside diameter between the stem assembly 14 and O-ring 30 and on its inner diameter at the armature assembly 24.

A cylindrical spring-loaded seal 44 is located in a cylindrical internal bore in poppet portion 27 of armature assembly 24. Elastomer spring-loaded seal 44 has a metallic back plate, and is spring-loaded against a valve seat 46 by a coil spring 50. A vent hole 29 occupies approximately 1/5 of the diameter of the poppet portion 27 of the armature assembly 24, and is provided to balance pressure on either side of the poppet portion 27. Cylindrical retaining cap 74 has an internal bore which mates with armature assembly 24 and an internal through-hole which allows the spring-loaded elastomer seal 44 to interface with valve seat 46.

In the preferred embodiment, flat spring 32 and valve body 12 are comprised of non-magnetic material, and armature assembly 24, pole 34, and yoke 40 are comprised of magnetic material.

Figure 2B:
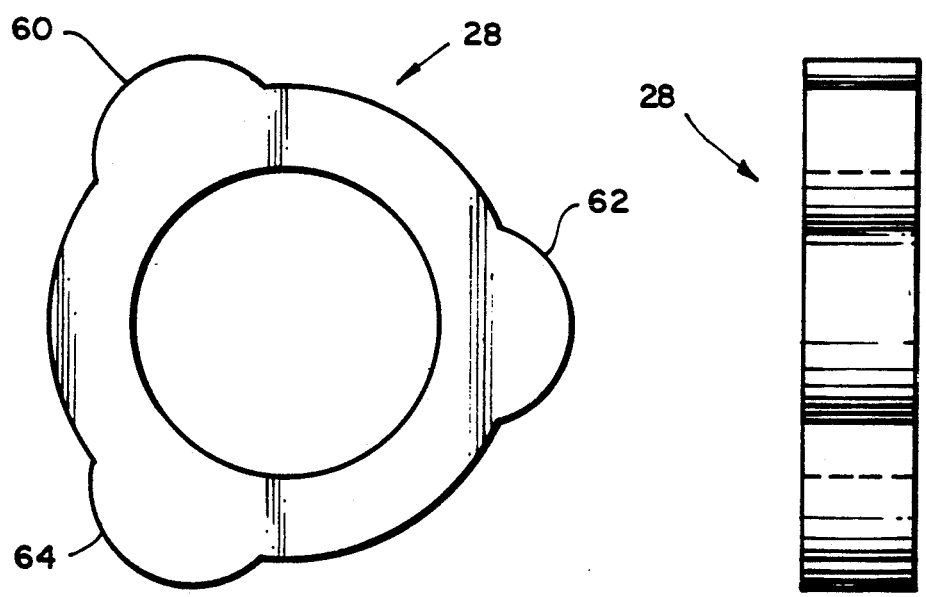
FIG. 2B is a side view of the valve elastomer damper element.

Referring to FIGS. 2A and 2B, the elastomer damper element 28 has three outer lobes 60, 62 and 64, and is fitted in cylindrical groove 26 of armature assembly 24.

Figures 3A, 3B:
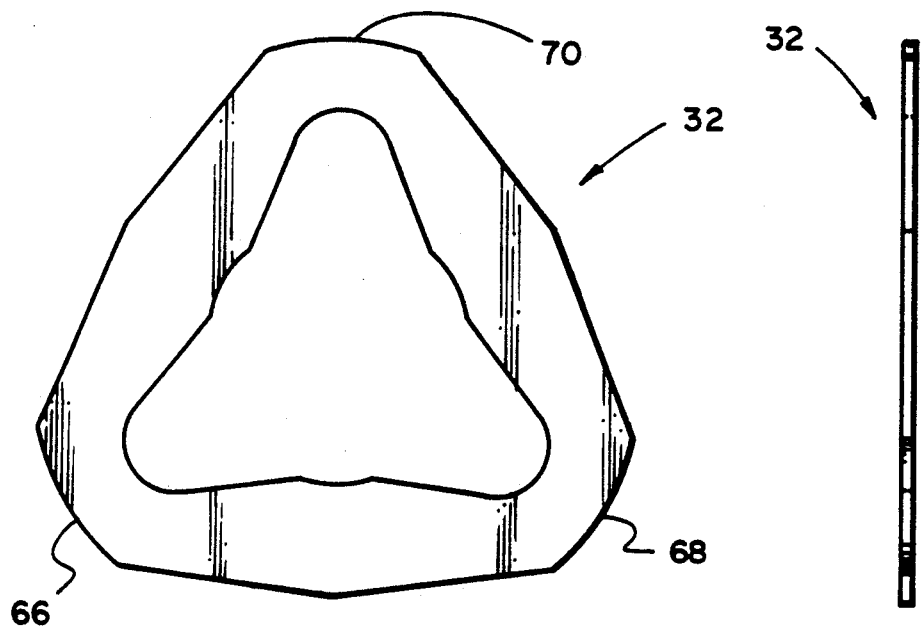
FIG. 3A is a top view of the valve flat spring.
FIG. 3B is a side view of the valve flat spring.

FIGS. 3A and 3B show flat spring 32 from top and side views. Flat spring 32 has three outer lobes 66, 68 and 70.

Figure 4:
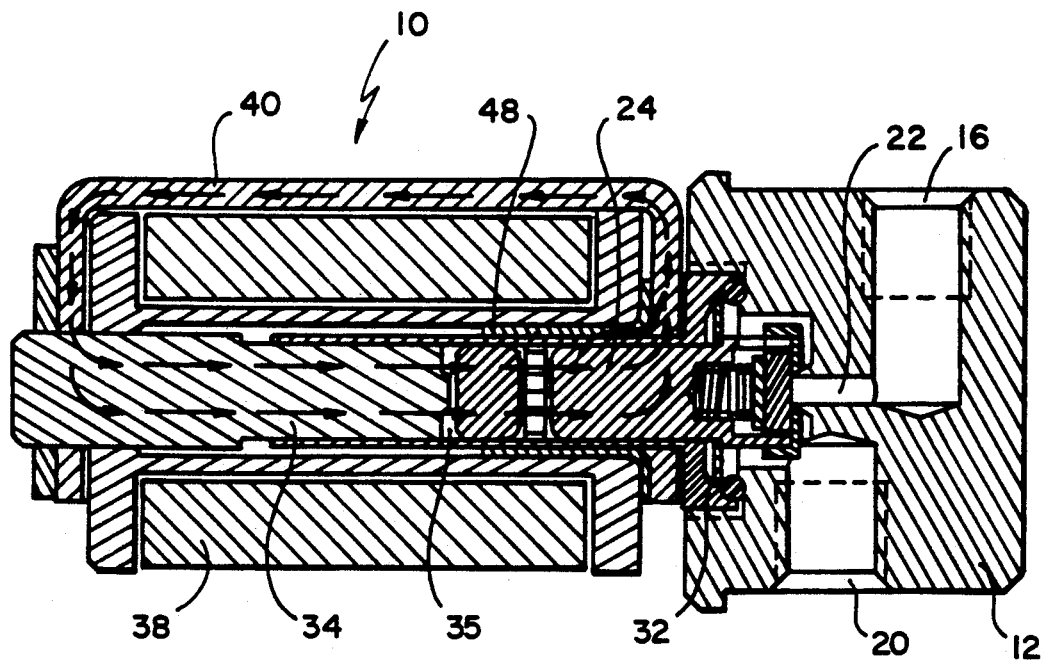
FIG. 4 is a cross-sectional view of the valve showing the magnetic path of the assembled proportional valve mechanism.

Referring to FIG. 4, the magnetic path through the assembled proportional valve mechanism is shown. As the solenoid coil 38 is energized, the coil magnetomotive force induces a flux through yoke 40 and pole 34, across a working gap 35, through armature assembly 24, and back to yoke 40 via flux concentrator 48. The magnetic flux induces a force of attraction between the armature assembly 24 and the pole piece 34, causing the armature assembly 24 to move towards pole piece 34. As the armature assembly 24 displaces towards pole piece 34 and away from orifice 22 in the valve body 12, the flat spring 32 opposes the solenoid force and controls the magnitude of the net deflection of the armature assembly 24. Increasing the coil current increases the force of attraction between the armature assembly 24 and the pole piece 34, thereby increasing the movement of the armature assembly 24 towards pole piece 34. As current is increased to the coil, the flow output of the valve increases proportionally. As current is decreased, the flow is decreased proportionally.

Figure 5A:
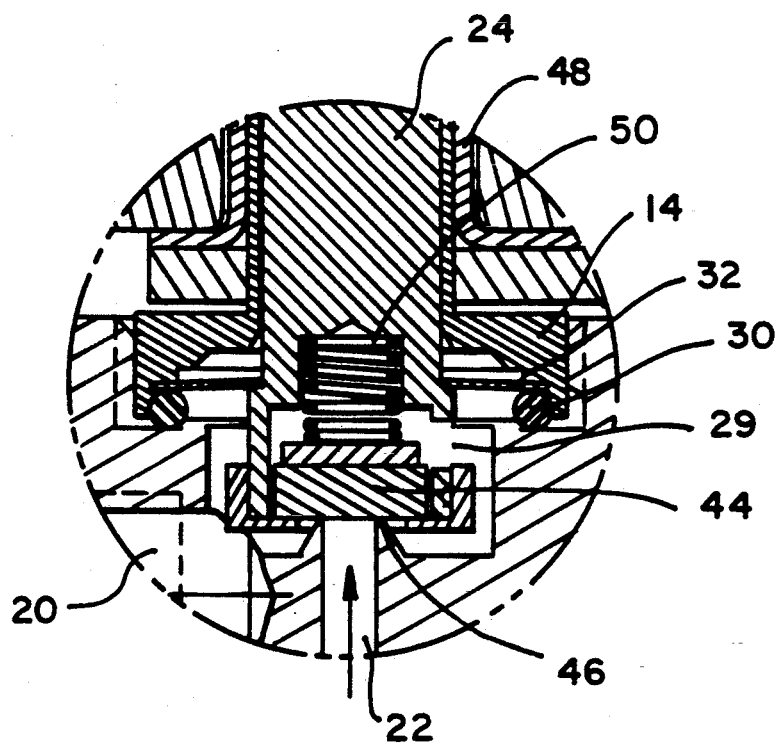
FIG. 5A is a cross-sectional view of a portion of the valve showing the flow path of the valve in a closed position.
Figure 5B:
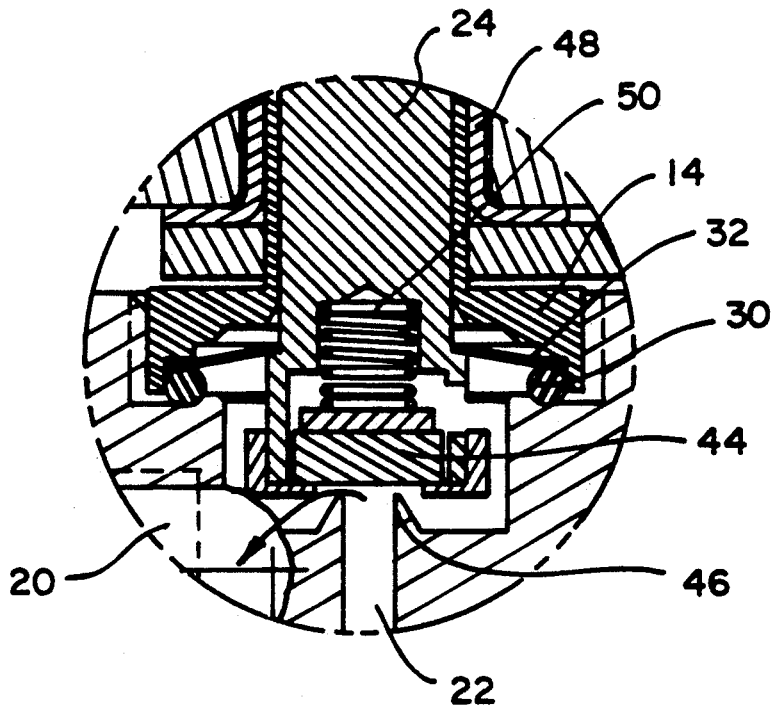
FIG. 5B is a cross-sectional view of a portion of the valve showing the flow path of the valve in an open position.

FIG. 5A shows the fluid flow path through the valve in a closed position, and FIG. 5B shows the fluid flow path through the valve in an open position. In FIG. 5A, no current is applied to the solenoid coil, and the armature assembly 24 is in contact with valve seat 46, preventing any fluid from flowing from input port 16, through orifice 22, and out through output port 20. As current is input to the solenoid coil, the armature assembly 24 moves away from orifice 22, and a variable flow is created that is proportional to the current input to the coil. FIG. 5B shows the valve in a fully open position. Armature assembly 24 is fully displaced from valve seat 46, and fluid flows from input port 16, through orifice 22, and out through outlet port 20. In an alternate embodiment, the flow direction is reversed, and the fluid flows in from port 20, through orifice 22, and out through port 16.

Figure 6A:
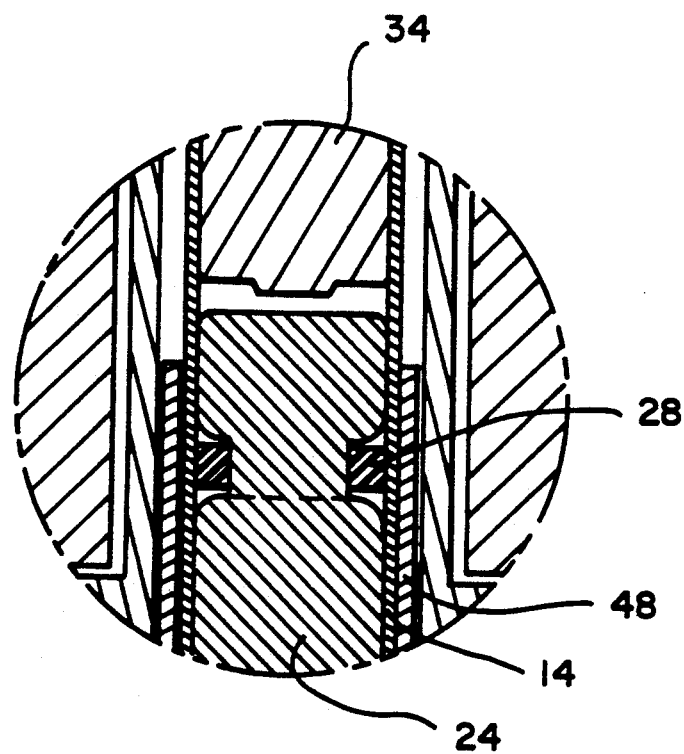
FIG. 6A is a cross-sectional view of a portion of the valve showing the damper configuration of the valve when the solenoid is in a de-energized state.
Figure 6B:
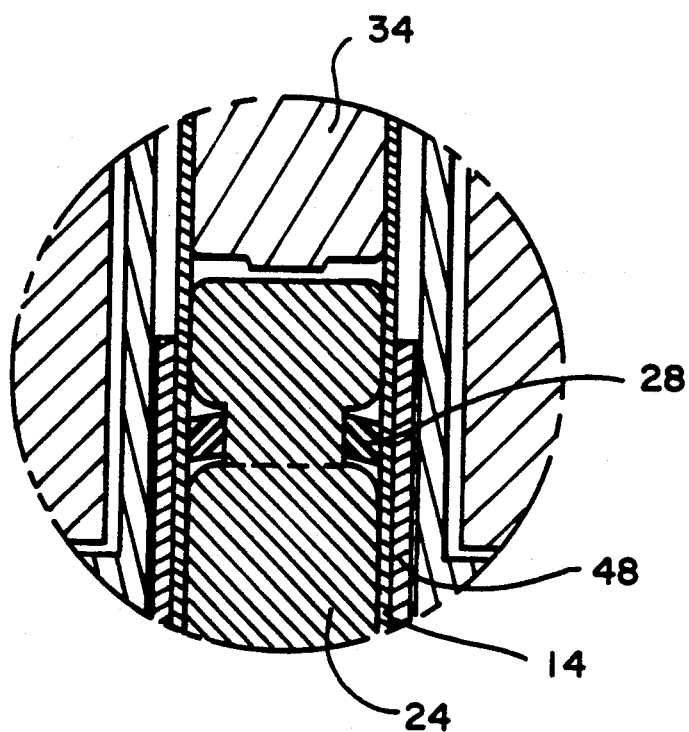
FIG. 6B is a cross-sectional view of a portion of the valve showing the damper configuration of the valve when the solenoid is in an energized state.

FIG. 6A shows the damper 28 when the solenoid is in a de-energized state, and FIG. 6B shows the damper 28 when the solenoid is in an energized state. Damper element 28 is fitted into a groove on the armature assembly 24. The outer lobes 60, 62 and 62 (shown in FIG. 2A) of the damper element 28 are compressed against the stem assembly wall. The compression of the outer lobes against the stem assembly wall provide sufficient static friction to prevent the damper from sliding, eliminating friction-induced hysteresis and dead band. When the solenoid is energized, the armature assembly 24 displaces towards pole 34 and the damper element 28 flexes. The portion of the damper that is compressed against the stem assembly wall does not move with respect to the wall. The lobes 60, 62 and 62 of the damper element deform in shear over the range of armature assembly travel, as shown in FIG. 6B. In the preferred embodiment, the range of armature travel is 0.010 inches and the damper is 30-40 durometer elastomer, allowing it to deform over the range of armature travel.

The damper 28 has several purposes. First, it modifies the natural frequency of the flat spring 32 and armature assembly 24 combination outside of the excitation region produced by the fluid flow and thereby damps out flow-induced oscillations at low flow conditions. The damper is a low cost method to dampen the mass-spring combination of the combination of the armature assembly and the flat spring. Although the proportional valve can be used without the damper element, the fluid flow is less controllable at low pressure and low flow conditions than when the damper element is provided.

The three-lobed shape of the damper allows the pressure to balance on either side of the armature assembly. The dampening action is accomplished by fabricating the damper from a low durometer, low shear modulus elastomer.

A second purpose of the damper is to centrally locate and guide the armature assembly 24 in the stem assembly 14 without any metal to metal contact, which improves the wear characteristics of the valve.

In addition, the damper 28 allows the natural frequency of the valve to be adjusted, depending upon the requirements of the application. By changing the damper element material, the level of dampening is changed, and therefore, the natural frequency of the valve may be changed.

Figure 7A:
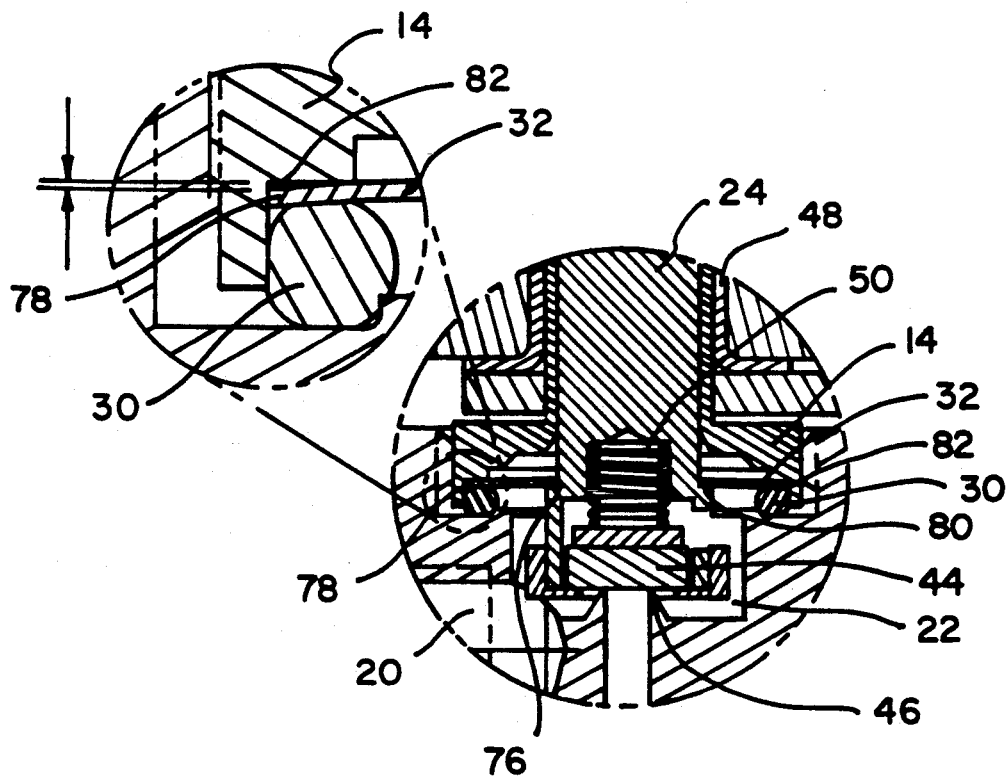
FIG. 7A is a cross-sectional view of a portion of the valve showing the flat spring of the valve when the solenoid is in a de-energized state.
Figure 7B:
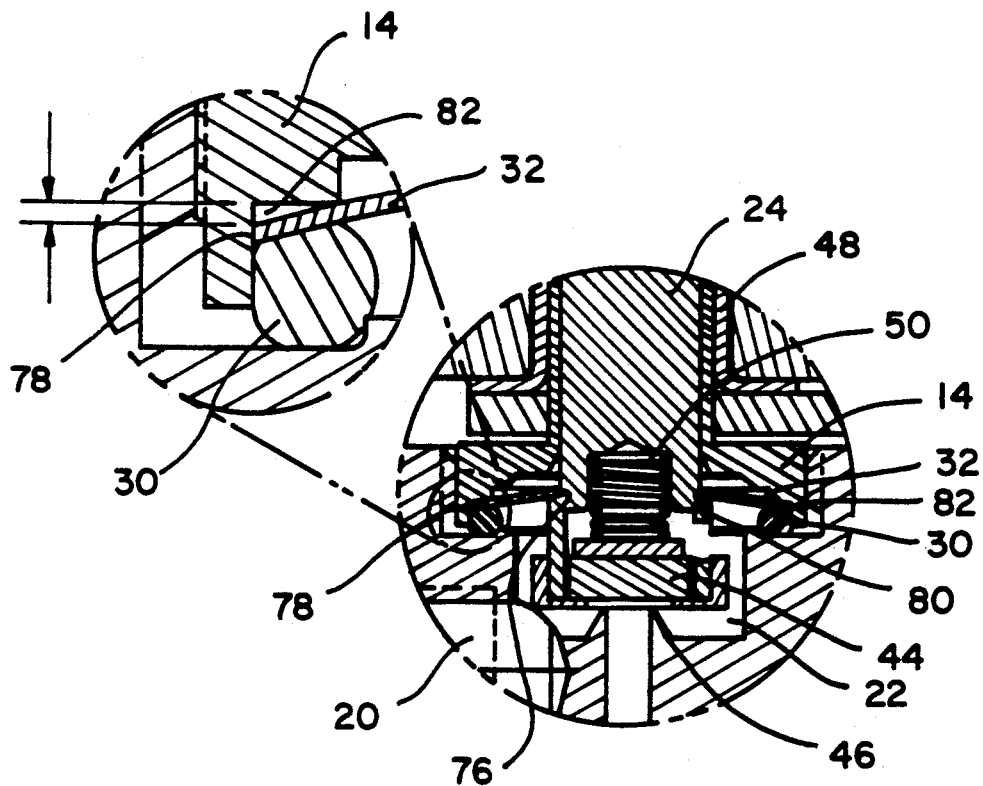
FIG. 7B is a cross-sectional view of a portion of the valve showing the flat spring of the valve when the solenoid is in an energized state.

Referring to FIG. 7A, the flat spring 32 is shown in a de-energized state, and in FIG. 7B, is shown in an energized state. The flat spring 32 regulates the displacement of the armature assembly 24 by providing resistance to the force induced by the solenoid. The spring is mounted without the need for clamping. The inside diameter 76 of flat spring 32 rests on ledge 80 of armature assembly 24. Outside diameter 78 is constrained between elastomer sealing O-Ring 30 and inverted ledge 82 of stem assembly 14.

Unlike traditional flat springs used in proportional solenoid valves, the flat spring 32 of the present invention is constrained on its outer diameter in one of the six degrees of freedom. Degrees of freedom is a term commonly used to describe how a structure is constrained in space relative to the three translational axes ($T_x$, $T_y$ and $T_z$) and the three rotational axes ($R_x$, $R_y$ and $R_z$). As shown in FIG. 3A, flat spring 32 has three outer lobes 66, 68, 70. The flat spring 32 is prevented from translation along the axis of the valve (translational axis $T_z$) by the ledge 82 that supports it. The flat spring 32 can translate in the plane of the ledge (translational axis $T_x$ and $T_y$) and can rotate about any axis.

As shown in FIG. 7B, the extreme outer diameter of the spring flexes when the solenoid is energized. Flat spring 32 exhibits a high spring rate with low stress concentrations, as compared to traditional flat springs. Its unique three-lobed shape, as shown in FIG. 3A, minimizes sharp corners, which limits the maximum stress to 30% of the ultimate strength. This reduces the susceptibility of the spring to failures related to fatigue. In the preferred embodiment, the flat spring rate may be from 100 to 130 lb/in.

Because the outside diameter of the flat spring 32 rests on the elastomer O-ring 30, when enough force is applied to the flat spring 32 by the armature assembly 24, the O-ring 30 will compress. The O-ring thus acts as an additional damper and provides viscous resistance in the valve.

Flat spring 32 also acts to center the armature assembly within the valve and to support the armature assembly to prevent its movement along the longitudinal axis. The spring eliminates interpart friction and provides a spring rate that is greater than the apparent spring rate of the solenoid within the operating range. The spring provides for looser manufacturing tolerances and a longer valve lifetime. Unlike other proportional solenoid valves which use fully-constrained flat springs, the flat spring of the present invention does not require any adjustment in the final assembly of the valve, and costly high precision machining and assembly techniques are eliminated.

Figure 8:
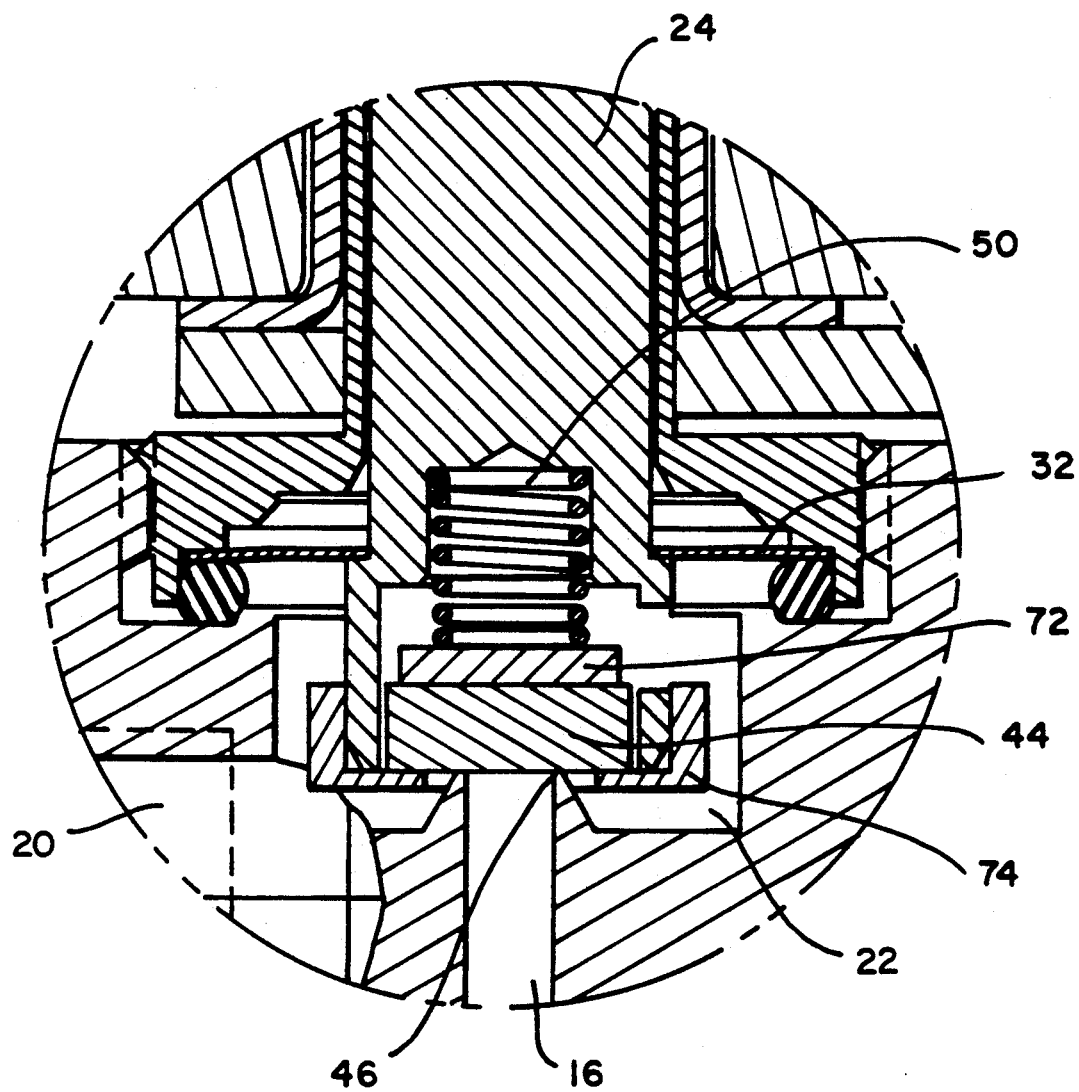
FIG. 8 is a cross-sectional view of a portion of the valve showing the spring-loaded elastomer seal of the valve.

FIG. 8 is a cross-sectional view of a portion of the valve showing the spring-loaded elastomer seal 44 of the valve. Elastomeric seal 44 is inserted into a longitudinal bore in the armature assembly 24. In the preferred embodiment, elastomeric seal 44 is 90 durometer and is attached to a metallic back-up plate 72 and a low spring rate coil spring 50. Cap 74 is pressed onto the armature assembly 24. The entire assembly is thus loaded, compressed and held in place by cap 74. The coil spring 50 has a low spring rate, which allows the coil spring to absorb any growth or shrinkage of the elastomer seal 44 without affecting the preload provided by the flat spring.

The spring-loaded seal configuration has several purposes. The first is to compensate for any dimensional instability of the elastomeric seal material due to swell and temperature variations. Because typical proportional solenoids use hard, usually either plastic or metal, metering elements, they do not allow for bubble-tight internal sealing. Secondly, the spring-loaded seal minimizes compression set by limiting the bearing stress on the elastomer. Finally, the seal design allows seal materials to be easily interchanged and allows critical sealing parameters to be controlled.

Traditional soft seal designs use elastomers that are either mechanically or chemically restrained in the armature assembly. In these configurations, small displacements of the armature assembly material work against the high spring rate of the flat spring, which results in large changes in preload forces and cracking pressures. The same dimensional changes in the spring-loaded seal design of the present invention has no effect of the preload or cracking pressure since the light coil spring absorbs the displacement and insulates the flat spring from the dimensional instability.

The spring-loaded seal design of the present invention also limits the bearing stresses. With traditional soft seal designs, the main spring rate is relatively high (100 lb/in) compared to the coil spring rate of the present invention (6 lb/in). A deflection of the armature assembly material in traditional spring designs results in high forces and bearing stresses compared to the same deflection in the spring-loaded design of the present invention.

While the foregoing invention has been described with reference to a particular embodiment, it should be understood that various modifications and alterations will occur to those practiced in the art. Such modifications and alterations are intended to fall within the scope of the appended claims.

We claim:

1. A solenoid-controlled proportional flow valve comprising:
   a solenoid having an axially extending coil defining a solenoid cavity;
   a valve body having a first fluid passage, a second fluid passage, and a valve seat between said first and second passages;
   a stem assembly positioned within said cavity;
   a valve armature assembly at least in part axially movable within said stem assembly for movement toward and away from said valve seat for blocking and variably unblocking the passage of fluids between said first and second passages; and
   an annular damper mounted on said armature assembly, a portion of said damper being compressed against a wall of said stem assembly,
   wherein said solenoid moves said armature assembly away from said valve seat in proportion to the flow of current through said solenoid and said damper deforms over the range of armature assembly travel as said armature assembly moves in response to the flow of current.

2. The solenoid-controlled proportional flow valve of claim 1, said damper having three outer lobes of semicircular shape.

3. The solenoid-controlled proportional flow valve of claim 2 wherein said outer lobes of said damper are compressed against said valve body.

4. The solenoid-controlled proportional flow valve of claim 3, wherein said outer lobes of said damper deform over the range of armature assembly travel while not moving positionally relative to said stem assembly wall.

5. A solenoid controlled proportional flow valve comprising:
   a solenoid having an axially extending coil defining a solenoid cavity;
   a valve body having a first fluid passage, a second fluid passage and a valve seat between said first and second passages;

a valve armature assembly axially movable at least partially within said solenoid cavity for movement toward and away from a seated, sealing contact with said valve seat;

an annular flat spring having an outside diameter, said outside diameter having spaced apart radially extending outer portions; and means for holding said spaced apart radially extending outer portions of said outside diameter of said flat spring resiliently between said armature assembly and said valve body so that said flat spring is constrained on its outer diameter in one of the axis degrees of freedom;

an inner diameter of said flat spring positioned to resist movement of said armature assembly away from said valve seat, wherein said solenoid moves said armature assembly away from said valve seat in proportion to the flow of current through said solenoid and said flat spring provides resistance to the force induced by said solenoid.

6. The valve of claim 5, said means for holding said flat spring further comprising:

a ledge on said armature assembly;

an O-ring filled into the outside periphery of said cavity; and a ledge on said valve body.

7. The valve of claim 6, the outside diameter of said flat spring being held between said O-ring and said ledge on said valve body and the inside diameter of said flat spring being held by said ledge on said armature assembly.

8. The solenoid-controlled proportional flow valve of claim 5 wherein said flat spring has three outer lobes, said outer lobes being held between said O-ring and said ledge on said valve body.

9. A solenoid controlled proportional flow valve comprising:

a solenoid having an axially extending coil defining a solenoid cavity;

a valve body having a first fluid passage, a second fluid passage and a valve seat between said passages;

a valve armature assembly axially movable at least partially within said solenoid cavity for movement toward and away from a seated, sealing contact with said valve seat;

an axial cavity in the end of said armature assembly adjacent said valve seal; and a low spring constant, spring loaded elastomer seal assembly comprising a low spring rate coil spring contained within said armature assembly axial cavity and attached an elastomer seal opposite said valve seat for mating contact with said valve seat in an armature closed position.

10. The valve of claim 9 wherein said spring assembly further comprises a metal backing plate position between and in contact with said low spring rate coil spring and said elastomer seal.

* * * * *